United States Patent [19]

Getz

[11] Patent Number: 4,555,268

[45] Date of Patent: Nov. 26, 1985

[54] METHOD FOR IMPROVING HANDLING PROPERTIES OF A FLAKED TANTALUM POWDER COMPOSITION

[75] Inventor: Marlyn F. Getz, Barto, Pa.

[73] Assignee: Cabot Corporation, Boston, Mass.

[21] Appl. No.: 683,243

[22] Filed: Dec. 18, 1984

[51] Int. Cl.⁴ .............................................. C22C 1/09
[52] U.S. Cl. ................................... 75/229; 148/126.1; 148/127; 75/251; 419/5; 419/23; 419/32; 419/38; 419/44
[58] Field of Search .................... 75/229, 15 BB, 228, 75/251; 419/5, 32, 23, 38, 44; 148/126.1, 127

[56] References Cited

U.S. PATENT DOCUMENTS 3,779,716  12/1973  Riley et al. ............................ 75/229
4,441,927   4/1984  Getz et al. ............................ 75/229

*Primary Examiner*—Stephen J. Lechert, Jr.
*Attorney, Agent, or Firm*—Robert J. Feltovic; Jack Schuman

[57] ABSTRACT

A method for improving the handling characteristics of a flaked tantalum powder composition comprising heat treating the flaked powder component of the composition in order to pre-agglomerate the flaked component prior to mixing it with the granular tantalum powder component of the composition.

12 Claims, No Drawings

METHOD FOR IMPROVING HANDLING PROPERTIES OF A FLAKED TANTALUM POWDER COMPOSITION

Solid tantalum capacitors, made from tantalum powder, have been a major contributor to the miniaturization of electronic circuits and have made possible the application of such circuits in extreme environments. Tantalum powder capacitors typically are manufactured by compressing tantalum powder to form a pellet, sintering the pellet in a furnace to form a porous body, and then subjecting it to anodization in a suitable electrolyte to form a continuous dielectric oxide film on the sintered body.

Development of tantalum powder suitable for solid capacitors has resulted from efforts by both capacitor producers and tantalum processors to delineate the characteristics required of tantalum powder in order for it to best serve in the production of quality capacitors. Such characteristics include surface area, purity, shrinkage, green strength, and flowability.

First of all, the powder should feature an adequate surface area, since the capacitance of tantalum powder is a function of surface area; the greater the surface area after sintering, the greater the capacitance.

Purity of the powder also is a critical consideration. Metallic and non-metallic contamination tend to degrade the dielectric. High sintering temperatures tend to remove some of the volatile contaminants; however, high temperatures reduce the net surface area and thus the capacitance of the capacitor. Minimizing the loss of surface area under sintering conditions is a requisite in order to maintain the capacitance of the tantalum powder.

The flowability of the tantalum powder and the green strength (mechanical strength of pressed, unsintered powder) are critical parameters for the capacitor producer in order to accommodate efficient production. The flowability of the powder allows smooth die feeding in high speed pressing operations; green strength permits product handling and transport without excessive breakage.

Currently, tantalum powders suitable for utility in high performance capacitors are produced by one of two different methods. The first of these powder production methods involves the sodium reduction of potassium fluotantalate, $K_2TaF_7$; in the second method, powder is produced by hydriding a melted (typically arc or electron beam melted) tantalum ingot, milling the hydrided chips, followed by dehydriding. In general, sodium reduced tantalum powders have provided high capacitance values per gram of powder, while melted ingot-derived tantalum powders are extremely pure, with contamination levels an order of magnitude lower than sodium reduced powders. Ingot-derived powders typically provide lower D.C. leakage, longer life, and higher voltage capability. Because of the high purity and other characteristics, capacitors made from ingot-derived powder are used in systems where high reliability is a prime requisite. However, more extensive utility of ingot-derived powder would be economically feasible if a powder composition could be developed which provided a high capacitance per gram of powder.

As discussed above, the capacitance of a tantalum pellet is a direct function of the surface area of the sintered powder. Greater surface area can be achieved, of course, by increasing the grams of powder per pellet, but, cost considerations have dictated that development be focused on means to increase the surface area per gram of powder utilized. Since decreasing the particle size of the tantalum powder produces more surface area per unit of weight, effort has been extended into ways of making the tantalum particles smaller without introducing other adverse characteristics that often accompany size reduction. Three of the major deficiencies of very fine powder are poor flow characteristics, excessive oxygen content, and excessive loss of surface area on sintering.

It was disclosed in U.S. Pat. No. 4,441,927, issued on Apr. 10, 1984 to Getz et al and assigned to Cabot Corporation, that a tantalum powder composition featuring advantageous properties for capacitor utility can be prepared by blending a proportion of a flaked tantalum powder into a base of a granular tantalum powder.

Now, according to the present invention, a process has been discovered that improves the handling characteristics of a tantalum powder composition including a flaked tantalum powder component.

The method of the present invention comprises first heat treating the flaked tantalum powder component of the tantalum powder composition prior to mixing the flaked tantalum powder with the granular tantalum powder component of the tantalum powder composition.

Pursuant to the present invention, the flaked tantalum powder component of a flaked/granular tantalum powder composition is pre-agglomerated by heating the flaked powder to a temperature ranging from about 1250° C. to about 1550° C. for a period ranging from about 5 to about 120 minutes. This pre-agglomeration is conducted using conventional heat treatment equipment and techniques that commonly are employed to agglomerate tantalum powder compositions. Following this pre-agglomeration heat treatment, the flaked tantalum powder then is blended with the granular tantalum powder by conventional mechanical techniques using an ordinary mixer, blender, or the like. Agglomeration of the flaked/granular tantalum powder composition may then be accomplished using conventional heat treatment agglomeration techniques. Typically, agglomeration temperatures range from about 1250° C. to about 1550° C. for a period ranging from about 5 to about 120 minutes.

Preferably, pre-agglomeration is conducted at a temperature ranging from about 1350° C. to about 1550° C. The pre-agglomeration heat treatment period preferably is from about 15 to about 45 minutes. Particularly preferred is pre-agglomeration at a temperature ranging from about 1450° C. to about 1525° C. for a period of from about 25 to about 35 minutes.

The quality of a tantalum powder is judged by many factors other than its specific capacitance. Such things as ease of flow, die filling capabilities, and green strength of pressed pellets made from the powder are all equally important to the capacitor manufacturer. In some cases these specific powder characteristics may indeed be the predominant characteristics that the tantalum capacitor manfacturer will use as a basis to accept or reject a tantalum powder lot. For example, a given tantalum powder may exhibit a high enough specific surface area for a specific capacitance but will not work in a pellet press due to poor flow characteristics. This tantalum powder lot would be rejected by the capacitor manufacturer. In another example, a tantalum powder may exhibit a high enough specific surface area for a specific capacitance but will have poor green strength when pressed at a specific density causing the green pellet to break or crumble upon ejection from the press. This powder lot, although it may meet the specific capacitance requirements, would also be rejected due to poor green strength.

It is well known in the tantalum powder industry that certain powder characteristics as powder flow, specific surface area, oxygen content, and other measurable physical and electrical properties can be modified in the course of production. However, in most cases, that alteration will most likely have an adverse effort on one or more of the other measured physical and electrical properties.

The subject invention is a process to improve the powder flow and die filling capabilities of a tantalum powder and also the green strength of a pressed pellet without adversely affecting other desirable powder properties.

Certain electrical properties of tantalum capacitors can be improved as the pressed density of a tantalum pellet is decreased. For example, the lower the pressed density, the higher the specific capacitance. Other measurable electrical properties such a ESR (Equivalent Series Resistance) are improved as pressed density is decreased.

There is, of course, a limit to the minimum pressed density that can be achieved while retaining the ability of a pressed green pellet to maintain its structural integrity when ejected from a pellet pressing machine.

A way to compare the minimum pressed densities at which given tantalum powders can be used to produce green pellets of acceptable structural integrity is to compare the crush strength of the pellets. The higher the crush strength at a given pressed density, the lower the green pressed density obtainable.

Although the process of the present invention can be effectively utilized with any tantalum powder composition including a flaked tantalum powder component, for purposes of illustration, the following examples demonstrate the invented process in preparing a flaked/granular tantalum powder composition as described in U.S Pat. No. 4,441,927, cited above.

It was disclosed in U.S. Pat. No. 4,441,927 that capacitors made from ingot-derived tantalum powder having a particle size less than about 10 microns exhibit very high capacitance when pellets are sintered at relatively low temperatures (e.g., 1400°–1600° C.). However, direct current leakage across the oxide film was unacceptably high at these low sinter temperatures; higher sintering temperatures minimized the leakage problem, but introduced a major reduction in capacitance. According to U.S. Pat. No. 4,441,927 it has been discovered that by blending a critical proportion of a specific flaked ingot-derived tantalum powder into a base of a granular ingot-derived tantalum powder having a particle size less than about 10 microns, a powder composition results which features advantageous properties for capacitor utility.

The composition disclosed in the cited patent is an agglomerated, ingot-derived tantalum powder composition comprising a granular tantalum powder having a particle size less than about 10 microns and including about 20 to about 40 percent by weight of a flaked tantalum powder having BET surface area of about 0.20 to about 0.40 m$^2$/gm produced by deforming a granular powder having a particle size ranging from about 10 microns to about 44 microns. The resulting composition has a final oxygen content of less than about 1900 ppm; a Scott Density of greater than about 25 g/in$^3$ (1500 kg/m$^3$); a crush strength of a pressed, unsintered pellet, pressed at 6.0 g/cc, of greater than about 15 lbs (67 N); and, a capacitance of a pellet pressed at 6.0 g/cc, and sintered at 1600° C., of greater than about 7500 CV/g.

Preferably, the ingot-derived, agglomerated tantalum powder composition comprises about 70 percent by weight granular tantalum powder base, and about 30 percent by weight flaked tantalum powder component. It is preferred that the composition have an oxygen content less than about 1800 ppm; a Scott Density greater than about 30 g/in$^3$); a crush strength of unsintered pellet, dry pressed at 6.0 g/cc, greater than about 20 lbs (89N); and, a capacitance of a pellet, pressed at 6.0 g/cc and sintered at 1600° C., of at least 7900 CV/g.

The composition disclosed in the cited patent involves a select, properly sized and flaked tantalum powder blended and agglomerated with a select granular tantalum powder of a particular particle size. The agglomerated composition containing a blend of tantalum powders having these different geometries features a surface area available for forming a dielectric oxide film after pressing and sintering operations which is much greater than is possible to achieve with granular powders. This advantage is accomplished because the agglomerated powder composition, by virtue of its unique geometry, enables one to form a pellet by dry pressing powder at low mechanical loads. It is theorized that the interlocking effect of the flaked powder produces an anode with high green strength; thus an optimum surface area prior to sintering is obtained. The composition also affords more resistance to surface area loss during sintering than do powders consisting solely of a granular geometry. Use of the described composition maximizes the surface area that can be obtained and thus permits achieving a higher capacitance per gram of granular ingot-derived powder than has been obtained heretofore.

The ingot-derived powder used for the composition disclosed in the cited patent can be produced using conventional techniques known in the art. The granular powder is made by hydriding tantalum ingot, grinding the tantalum hydride chips to powder, and dehydriding the powder. Mechanical deformation of the granular powder to flake form is accomplished by conventional mechanical techniques using a ball mill, rod mill, roll mill, or the like. The ingot may be prepared by any suitable melt technique; arc melting and electron beam melting are the most common techniques. Electron beam melting is preferred.

The flaked tantalum powder component may be mixed with the granular powder component by conventional mechanical techniques using an ordinary mixer, blender or the like. Agglomeration of the powder composition may be accomplished using conventional heat treatment agglomeration techniques. Typically, agglomeration temperatures range from about 1250° C. to about 1550° C.

One can markedly further enhance the capacitance per gram of the disclosed composition by adding a phosphorus-containing material to the powder. It is preferred to add this material in the range of about 5 to about 50 parts per million based on elemental phosphorus; about 15 to about 30 ppm phosphorus is particularly preferred. Any of the known phosphorus-containing materials used in the art as tantalum powder additives may be used. This treatment tends to inhibit the rapid loss of surface area which usually occurs when very fine powders are heat treated at temperatures above one half of their melting point.

In the following examples, it is demonstrated that pre-agglomeration of the flake portion of a powder/flake blend, such as described in U.S. Pat. No. 4,441,927, will significantly increase the green strength of a pressed pellet without adverse effects on the measured physical and electrical properties of the pellet.

In regard to the particular powder compositon used in the examples, another advantage to be gained by this invention is a significant reduction of the fraction of −44 micron size agglomerates in the finished powder. This reduction in −44 micron size powder will allow the powder to flow faster and will contribute to better die fill and more precise weight control in powder pelletizing machines. The reduction of the −44 micron size material will also inhibit the shrinkage of the sintered pellet allowing better size control where this is a critical factor.

Table I below lists treatment conditions and resulting properties of an illustrative tantalum powder composition. The testing procedures for the determination of these values are as follows:

Procedure for Capacitance Determination (a) Pellet Fabrication:
The tantalum powder was compressed in a commercial pellet press without the aid of binders. The pressed density was 6.0 g/cc using a powder weight of 1.2 g and a diameter of 6.4 mm.

(b) Vacuum Sintering:
The compacted pellets were sintered in a high vacuum of less than $10^{-5}$ torr (0.00133 Pa) for 30 minutes at temperatures in excess of 1500° C.

(c) Anodization:
The sintered pellets were anodized in a forming bath at 90°±2° C. at 100 V DC. The electrolyte was 0.1% phosphoric acid.
The anodization rate was controlled to be 1 volt per minute. After a period of 3 hours at 100 V DC, the pellets were washed and dried.

(d) Testing Conditions:
Capacitance Measurement
Electrolyte—10% $H_3PO_4$
Temperature—21° C.
Charge Transfer Capacitance Determination Procedure for Pellet Strength Determination (a) Anode Fabrication:
The tantalum powder was compressed in a commercial pellet press without the aid of binders. The pressed density was 6.0 g/cc using a powder weight of 1.6 g and a diameter and length of 6.4 mm and 8.4 mm, respectively.

(b) Testing:
The cylindrical pellet is placed between two flat plates with its longitudinal axis parallel to the plates; a steadily increasing force is applied to one of the plates until the pellet breaks. The force is recorded at the point of breakage.

Particle Size

Particle size determinations are measured by laser scattering technique using a Leeds & Northrup Microtrac Particle Analyzer Model No. 7991-02.

Shrinkage

Shrinkage determinations are performed by measuring the diameter of a green pressed pellet, sintering the pellet, and then measuring the diameter of the sintered pellet. Measurements to 0.001 inch are made using a micrometer. The percent shrinkage is calculated by the following formula: (green diameter-sintered diameter/green diameter) X100=% diameter shrinkage.

BET Surface Area

The total surface area of the tantalum flake is measured using a Numinco Orr surface area pore volume analyzer (manufactured by Numec Corporation). The BET (Brunauer-Emmet-Teller) surface areas obtained in this manner include the external surface area as well as the internal surface area contributed by the presence of pores.

In the Table below, both the comparative examples as well as the examples of the present invention use a flaked/granular electron beam ingot-derived tantalum powder composition consisting of about 70 percent by weight of a granular tantalum powder component having a particle size less than about 10 microns and about 30 percent by weight of a flaked tantalum powder component having a BET surface area of about 0.30 m²/gm produced by deforming a granular tantalum powder having a particle size ranging from about 10 to about 44 microns.

The powder composition was prepared by mixing the flaked and granular powder components for 3 minutes in a standard Patterson-Kelly V blender. The composition was agglomerated by heating it at a temperature of about 1350°-1550° C. for about 30 minutes in a vacuum furnace. The pre-agglomeration of the flaked tantalum powder component, according to the invention, was conducted at the reported temperatures in a similar vacuum furnace for about 30 minutes.

TABLE I

| | Example | | | | | |
|---|---|---|---|---|---|---|
| | C1* | 2 | C3* | 4 | C5* | 6 |
| Preagglomeration Temp (°C.) | None | 1450 | None | 1450 | None | 1450 |
| Final Agglomeration Temp (°C.) | 1350 | 1350 | 1450 | 1450 | 1550 | 1550 |
| <44u Size (%) | 40.9 | 22.7 | 26.5 | 20.8 | 29.8 | 9.0 |
| Crush Strength of Green Pellet | | | | | | |
| @ 5.5 g/cc (lb) | 10.75 | 23.75 | 12.25 | 24.75 | 22.5 | 37.75 |
| @ 6.0 g/cc (lb) | 23.5 | 43.5 | 27.75 | 43.25 | 38.75 | 50 |
| Electrical Data | | | | | | |
| Pressed @ (g/cc) | 6.0 | 6.0 | 6.0 | 6.0 | 6.0 | 6.0 |
| Sintered @ (°C.) | 1600 | 1600 | 1600 | 1600 | 1600 | 1600 |
| Capacitance (CV/g) | 7000 | 7110 | 6750 | 6810 | 6800 | 6790 |
| Shrinkage (%) | 7.9 | 4.0 | 5.8 | 3.8 | 5.3 | 2.5 |

*Comparative Examples

The embodiments of the invention in which an exclusive property or privilege is claimed are defined as follows:

1. A method of preparing a tantalum powder composition comprising:
heat treating a flaked tantalum powder at a temperature ranging from about 1250° C. to about 1550° C. for a period ranging from about 5 to about 120 minutes in order to pre-agglomerate the flaked powder;

mixing the pre-agglomerated flaked tantalum powder with a granular tantalum powder to form a tantalum powder composition;

agglomerating said tantalum powder composition at a temperature of about 1250° C. to about 1550° C. for a period of from about 5 to about 120 minutes.

2. The method of claim 1 wherein the flaked tantalum powder is heat treated at a temperature ranging from about 1350° C. to about 1550° C.

3. The method of claim 1 wherein the flaked tantalum powder is heat treated at a temperature ranging from about 1450° C. to about 1525° C.

4. The method of claim 2 wherein the flaked tantalum powder is heat treated for a period ranging from about 15 to about 45 minutes.

5. The method of claim 3 wherein the flaked tantalum powder is heat treated for a period ranging from about 25 to about 35 minutes.

6. The method of claim 1 wherein the flaked tantalum powder that is heat treated has a BET surface area of about 0.20 to about 0.40 $m^2/gm$ produced by deforming a granular tantalum powder having a particle size ranging from about 10 microns to about 44 microns.

7. The method of claim 6 wherein the granular tantalum powder has a particle size less than about 10 microns.

8. The method of claim 7 wherein the pre-agglomerated flaked tantalum powder is mixed with the granular tantalum powder to form a composition comprising from about 20 to about 40 percent by weight of flaked tantalum powder.

9. The method of claim 1 wherein the tantalum composition is an electron beam ingot-derived agglomerated tantalum powder composition.

10. The method of claim 1 comprising:

heat treating a flaked tantalum powder having a BET surface area of about 0.30 $m^2/gm$, produced by deforming a granular tantalum powder having a particle size ranging from about 10 to about 44 microns, at a temperature ranging from about 1350° C. to about 1550° C. for a period ranging from about 15 to about 45 minutes; and mixing the pre-agglomerated flaked tantalum powder with a granular tantalum powder having a particle size less than about 10 microns to form a composition comprising about 70 percent by weight of granular powder.

11. The tantalum powder composition prepared according to the method of claim 1.

12. The tantalum powder composition prepared according to the method of claim 10.

* * * * *